(12) United States Patent
Song et al.

(10) Patent No.: US 11,752,908 B2
(45) Date of Patent: Sep. 12, 2023

(54) CAR SEAT HEATER HAVING IMPROVED ENERGY EFFICIENCY

(71) Applicants: HYUNDAI TRANSYS INCORPORATED, Seosan-si (KR); YUSHINPRECISIONINDUSTRIAL CO., LTD, Incheon (KR)

(72) Inventors: Hyun Seok Song, Hwaseong-si (KR); Su Chui Yoon, Incheon (KR); Jong Bok Lee, Incheon (KR); Beom Sun Kim, Hwaseong-si (KR); Tae Hyoung Yang, Hwaseong-si (KR)

(73) Assignees: HYUNDAI TRANSYS INCORPORATED, Seosan-si (KR); YUSHINPRECISIONINDUSTRIAL CO., LTD., Incheon (KR)

( * ) Notice: Subject to any disclaimer, the term of this patent is extended or adjusted under 35 U.S.C. 154(b) by 0 days.

(21) Appl. No.: 17/718,609

(22) Filed: Apr. 12, 2022

(65) Prior Publication Data

US 2022/0324360 A1   Oct. 13, 2022

(30) Foreign Application Priority Data

Apr. 13, 2021   (KR) .................. 10-2021-0047819

(51) Int. Cl.
 *A47C 4/02*   (2006.01)
 *B60N 2/56*   (2006.01)
(52) U.S. Cl.
 CPC .................... *B60N 2/5685* (2013.01)

(58) Field of Classification Search
 CPC .......... B60N 2/5685; B60N 2002/0264; H05B 2203/029; H05B 2203/003; H05B 2203/036; H05B 1/0238; H05B 2203/004; H05B 2203/005; A47C 7/748; A41D 1/005
 See application file for complete search history.

(56) References Cited

U.S. PATENT DOCUMENTS

| 4,731,298 | A  | * | 3/1988  | Shindo    | C22C 49/14  |
|           |    |   |         |           | 428/614     |
| 6,483,087 | B2 | * | 11/2002 | Gardner   | B32B 17/04  |
|           |    |   |         |           | 219/545     |
| 7,372,006 | B2 | * | 5/2008  | Aisenbrey | B29C 45/0013|
|           |    |   |         |           | 219/535     |
| 7,478,869 | B2 | * | 1/2009  | Lazanja   | B60N 2/5635 |
|           |    |   |         |           | 297/180.13  |

(Continued)

FOREIGN PATENT DOCUMENTS

| CN | 101600271 A | 12/2009 |
| KR | 10-2011-0020988 A | 3/2011 |

(Continued)

*Primary Examiner* — Shin H Kim
(74) *Attorney, Agent, or Firm* — Bridgeway IP Law Group, PLLC; Jihun Kim

(57) ABSTRACT

A car seat heater has an improved energy efficiency, which includes a heating wire which is coupled to a car seat and includes a metal-plated carbon fiber, a seat temperature sensor configured to detect temperature of the heating wire, and a variable temperature controller configured to control temperature of the heating wire according to a diameter of the metal-plated carbon fiber and a thickness of a plated metal thereof.

4 Claims, 5 Drawing Sheets

(56) References Cited

U.S. PATENT DOCUMENTS

| | | | | |
|---|---|---|---|---|
| 8,544,942 | B2* | 10/2013 | Lazanja | A47C 7/748 |
| | | | | 219/217 |
| 8,939,501 | B2* | 1/2015 | Nishikawa | H05B 1/0238 |
| | | | | 297/180.12 |
| 9,027,668 | B2* | 5/2015 | Zediker | E21B 44/00 |
| | | | | 175/16 |
| 9,241,373 | B2* | 1/2016 | Schaeffer | B60N 2/5685 |
| 9,657,963 | B2* | 5/2017 | Lazanja | H05B 3/36 |
| 11,155,190 | B2* | 10/2021 | Furui | B60N 2/5685 |
| 2011/0074380 | A1* | 3/2011 | Jeon | H05B 3/56 |
| | | | | 174/250 |
| 2011/0156453 | A1* | 6/2011 | Matsushima | B62J 1/12 |
| | | | | 297/180.12 |
| 2015/0083705 | A1* | 3/2015 | Cronn | H05B 3/347 |
| | | | | 219/549 |
| 2018/0280190 | A1* | 10/2018 | Betkowski | A41D 13/0051 |
| 2019/0029877 | A1* | 1/2019 | Betkowski | A41D 27/205 |
| 2020/0391634 | A1* | 12/2020 | Furui | A47C 7/74 |
| 2020/0404987 | A1* | 12/2020 | Betkowski | A41D 1/005 |
| 2022/0394821 | A1* | 12/2022 | Tong | H05B 1/0272 |

FOREIGN PATENT DOCUMENTS

| | | |
|---|---|---|
| KR | 10-1254154 B1 | 4/2013 |
| KR | 10-2044197 B1 | 11/2019 |
| WO | 2014-184743 A1 | 11/2014 |

* cited by examiner

| CLASSIFICATION | THE DISCLOSURE(MCF) | | CONVENTIONAL METAL HEATING WIRE | |
|---|---|---|---|---|
| | BOTTOM PLATE | BACK PLATE | BOTTOM PLATE | BACK PLATE |
| DIAMETER($\mu m$) | 1 | 10 | 1 | 10 |
| THICKNESS OF PLATED METAL ($\mu m$) | 0.3 | 1 | – | – |
| TEMPERATURE RISE TIME TO 60°C(s) | 210 | 290 | 630 | 540 |

FIG. 2

| CLASSIFICATION | THE DISCLOSURE(MCF) | | CONVENTIONAL METAL HEATING WIRE | |
|---|---|---|---|---|
| | BOTTOM PLATE | BACK PLATE | BOTTOM PLATE | BACK PLATE |
| DIAMETER(μm) | 1 | 3 | 1 | 3 |
| THICKNESS OF PLATED METAL (μm) | 0.3 | 0.6 | – | – |
| TEMPERATURE RISE TIME TO 60℃(s) | 210 | 245 | 630 | 450 |

FIG. 3

| CLASSIFICATION | THE DISCLOSURE(MCF) | | CONVENTIONAL METAL HEATING WIRE | |
| --- | --- | --- | --- | --- |
| | BOTTOM PLATE | BACK PLATE | BOTTOM PLATE | BACK PLATE |
| DIAMETER($\mu$m) | 3 | 6 | 3 | 6 |
| THICKNESS OF PLATED METAL ($\mu$m) | 0.6 | 0.8 | – | – |
| TEMPERATURE RISE TIME TO 60°C(s) | 235 | 260 | 705 | 485 |

FIG. 4

| CLASSIFICATION | THE DISCLOSURE(MCF) | | CONVENTIONAL METAL HEATING WIRE | |
| --- | --- | --- | --- | --- |
| | BOTTOM PLATE | BACK PLATE | BOTTOM PLATE | BACK PLATE |
| DIAMETER($\mu m$) | 6 | 10 | 6 | 10 |
| THICKNESS OF PLATED METAL ($\mu m$) | 0.8 | 1 | – | – |
| TEMPERATURE RISE TIME TO 60°C (s) | 250 | 290 | 750 | 540 |

FIG. 5

CAR SEAT HEATER HAVING IMPROVED ENERGY EFFICIENCY

CROSS-REFERENCE TO RELATED APPLICATION(S)

This application is based on and claims priority under 35 U.S.C. 119 to Korean Patent Application No. 10-2021-0047819, filed on Apr. 13, 2021, in the Korean Intellectual Property Office, the disclosure of which is herein incorporated by reference in its entirety.

BACKGROUND OF THE INVENTION

1. Field of the Invention

The present disclosure relates to a car seat heater having improved energy efficiency and, more specifically, to a car seat heater having improved energy efficiency, which can adjust the temperature rise time of a heating wire including a metal-plated carbon fiber.

2. Description of the Prior Art

Carbon fiber has high strength, high elasticity, super-lightweightness, and excellent high-temperature strength maintenance ratio, but has low electric conductivity, which limits the application field thereof. In order to solve this problem and to apply the same to electromagnetic wave shielding and heaters, metal-coated carbon fiber (MCF) has been developed by coating carbon fiber with metal through a physical or chemical method.

A seat heater refers to a car component configured to increase the temperature of a car seat by using heat generated by an electric resistance such that, when a driver gets in a car in winter, the seat temperature is quickly increased, thereby providing a comfortable driving environment.

Conventional seat heaters have a problem of long temperature rise time, and in an attempt to solve this problem, seat heaters have been developed, to which heating wires including MCF are applied. Seat heaters having MCF applied thereto have a problem in that the temperature rises abruptly. There is a need for development of a temperature control device for solving this problem and development of a car seat heater for preventing energy efficiency degradation due to abrupt temperature rise.

SUMMARY OF THE INVENTION

The present disclosure has been made to solve the above-mentioned problems, and the present disclosure to provide a car seat heater having improved energy efficiency, wherein a seat heater includes a temperature control device such that the seat temperature rise time can be adjusted, and the diameter of a metal-plated carbon fiber included in a heating wire installed in a car seat is configured to be different from the thickness of the plated metal such that the energy efficiency can be improved.

A car seat heater having improved energy efficiency according to an embodiment of the present disclosure includes a heating wire which is coupled to a car seat and includes a metal-plated carbon fiber, a seat temperature sensor configured to detect a temperature of the heating wire, and a variable temperature controller configured to control the temperature of the heating wire according to a diameter of the metal-plated carbon fiber and a thickness of a plated metal thereof.

In addition, the diameter of the metal-plated carbon fiber of the heating wire may be equal to or greater than 1 μm and less than 10 μm, and the thickness of the plated metal of the metal-plated carbon fiber of the heating wire may be equal to or greater than 0.3 μm and less than 1 μm.

In addition, when the diameter of the metal-plated carbon fiber of the heating wire is equal to or greater than 1 μm and less than 3 μm and the thickness of plated metal of the metal-plated carbon fiber of the heating wire is equal to or greater than 0.3 μm and less than 0.6 μm, a temperature control sensitivity of the variable temperature controller may be adjusted such that the heating wire is heated to 60 degrees for a temperature rise time to be equal to or greater than 210 seconds and less than 245 seconds.

In addition, when the diameter of the metal-plated carbon fiber of the heating wire is equal to or greater than 3 μm and less than 6 μm and the thickness of plated metal of the metal-plated carbon fiber of the heating wire is equal to or greater than 0.6 μm and less than 0.8 μm, the temperature control sensitivity of the variable temperature controller may be adjusted such that the heating wire is heated to 60 degrees for a temperature rise time to be equal to or greater than 235 seconds and less than 260 seconds.

In addition, when the diameter of the metal-plated carbon fiber of the heating wire is equal to or greater than 6 μm and less than 10 μm and the thickness of plated metal of the metal-plated carbon fiber of the heating wire is equal to or greater than 0.8 μm and less than 1 μm, the temperature control sensitivity of the variable temperature controller may be adjusted such that the heating wire is heated to 60 degrees for a temperature rise time to be equal to or greater than 250 seconds and less than 290 seconds.

In addition, the variable temperature controller may include a variable temperature control part configured to adjust a temperature control sensitivity according to the diameter of the metal-plated carbon fiber and the thickness of the plated metal.

A car seat heater having improved energy efficiency according to an embodiment of the present disclosure may adjust the temperature rise time of a heating wire installed in a car seat through a temperature control device.

In addition, according to a car seat heater having improved energy efficiency according to an embodiment of the present disclosure, the diameter of a metal-plated carbon fiber included in a heating wire of a seat may be configured to be different from the thickness of the plated metal, thereby improving the energy efficiency.

BRIEF DESCRIPTION OF THE DRAWINGS

The above and other aspects, features and advantages of the present disclosure will be more apparent from the following detailed description taken in conjunction with the accompanying drawings, in which:

FIG. 2 is a diagram showing a result of comparing temperature rise times of a car seat heater having improved energy efficiency according to a first embodiment of the present disclosure;

FIG. 3 is a diagram showing a result of comparing temperature rise times of a car seat heater having improved energy efficiency according to a second embodiment of the present disclosure;

FIG. 4 is a diagram showing a result of comparing temperature rise times of a car seat heater having improved energy efficiency according to a third embodiment of the present disclosure; and FIG. 5 is a diagram showing a result of comparing temperature rise times of a car seat heater having improved energy efficiency according to a fourth embodiment of the present disclosure.

DETAILED DESCRIPTION OF THE EXEMPLARY EMBODIMENTS

Figure 1:
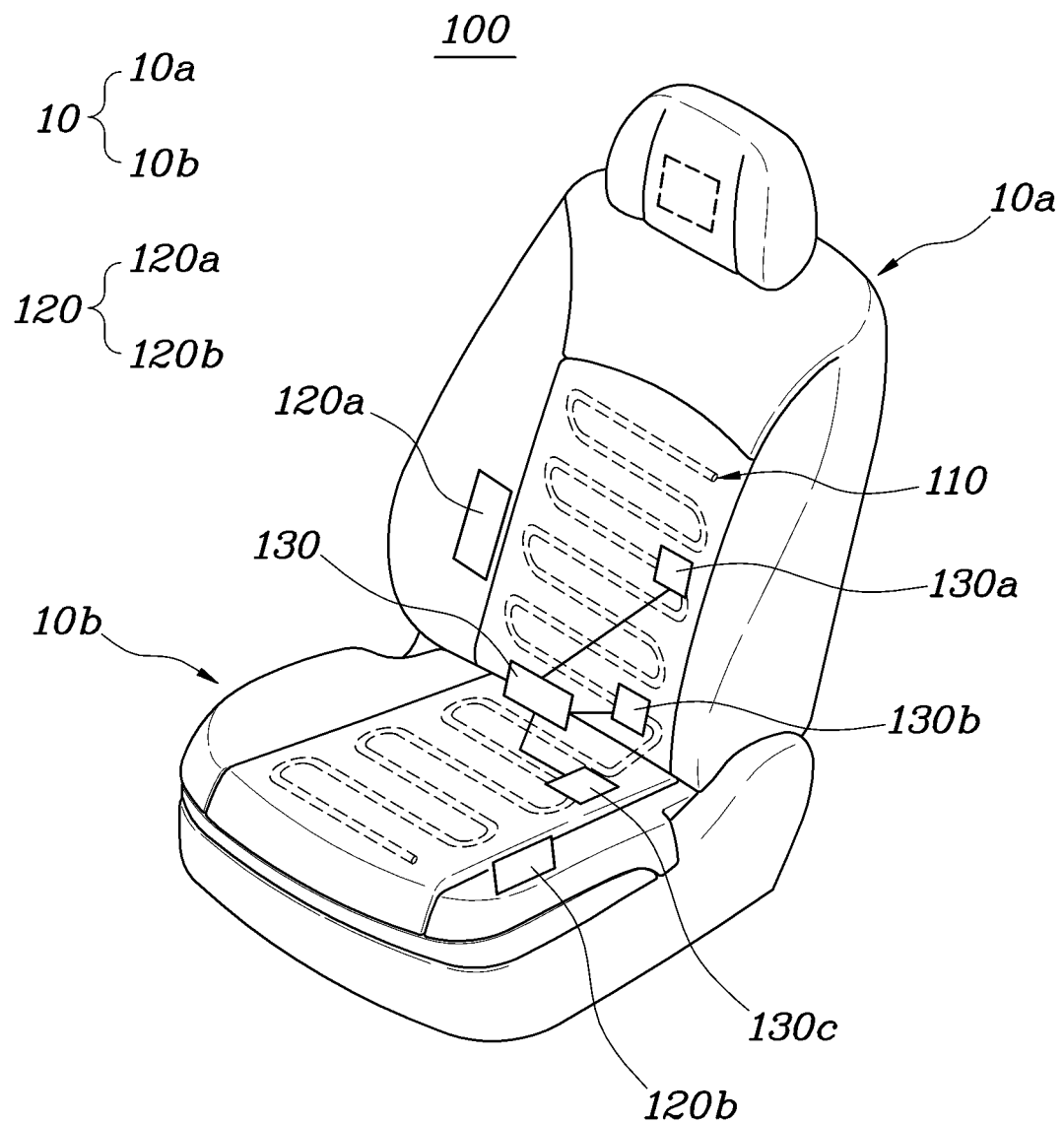
FIG. 1 is a perspective view of a car seat heater having improved energy efficiency according to a first embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Although such terms as "a first" and "a second" may be used to describe various elements, components, and/or sections, the elements, components, and/or sections should not be limited by these terms. These terms are intended merely to distinguish one element, component, or section from other elements, components, or sections. Therefore, it will be apparent that a first element, first component, or first section may be a second element, second component, second section within the technical idea of the present disclosure.

The terms used in the present disclosure are merely used to describe embodiments, and are not intended to limit the present disclosure. In the specification, a singular expression may include a plural expression unless specially mentioned in a phrase. As used herein, the expression "comprise" and/or "made of" are intended to specify the existence of mentioned components, steps, operations, and/or elements, and do not preclude the possible existence or addition of one or more other components, steps, operations, and/or elements.

Unless defined otherwise, all terms used herein have the same meaning as those commonly understood by a person skilled in the art to which the present disclosure pertains. Such terms as those defined in a generally used dictionary are not to be interpreted to have ideal or excessively formal meanings unless specially defined herein.

Hereinafter, the present disclosure will be described in detail with reference to the accompanying drawings.

FIG. 1 is a perspective view of a car seat heater having improved energy efficiency according to a first embodiment of the present disclosure.

Referring to FIG. 1, a car seat heater having improved energy efficiency 100 (hereinafter, referred to as a seat heater) according to a first embodiment of the present disclosure may include a heating wire 110, a seat temperature sensor 120, and a variable temperature controller 130.

The heating wire 110 may include a metal-plated carbon fiber coupled to a car seat 10.

A carbon fiber of the metal-plated carbon fiber included in the heating wire 110 may use at least one selected from a PAN-based, a pitch-based, a rayon-based carbon fiber and carbon nano-fiber. In addition, a carbon fiber may have a one-dimensionally extended structure, and the carbon fiber may be a continuous carbon fiber having a predetermined length.

A metal of the metal-plated carbon fiber included in the heating wire 110 may be one or more selected from the group consisting of copper (Cu), nickel (Ni), and silver (Ag). That is, a metal plated layer may include only one of copper (Cu), nickel (Ni), and silver (Ag), and may be a double plated layer or more. Here, when the metal plated layer is a multi-plated layer, the metal-plated layer may include a double plated layer or a triple plated layer in which different metals are continuously plated. For example, the multi-plated layer may include Ni as a first plated layer, Cu as a second plated layer, and Ag as a third plated layer.

The metal-plated carbon fiber according to a first embodiment of the present disclosure may be manufactured in a manner of immersing a carbon fiber in an electroless metal plating solution to plate the carbon fiber with metal. When a carbon fiber is plated by electroplating, the metal plated on the carbon fiber may have non-uniformity and the carbon fiber may have very high resistance. On the other hand, when a carbon fiber is plated by electroless plating, the carbon fiber may have a plated metal having a uniform thickness, which is formed on the surface thereof, and may have excellent electrical conductivity.

The diameter of the metal-plated carbon fiber of the heating wire 110 according to a first embodiment of the present disclosure may be equal to or more than 1 μm and less than 10 μm, and the thickness of the plated metal of the metal-plated carbon fiber of the heating wire 110 may be equal to or more than 0.3 μm and less than 1 μm.

In order to improve processability and dispersibility, it is preferable to use a carbon fiber having a diameter of equal to or more than 1 μm and less than 10 μm. When the diameter of the fiber is out of the range of equal to or more than 1 μm and less than 10 μm, a metal to be plated may not be dispersed in the network formed by fibers connected to each other so that low surface resistance cannot be obtained.

In addition, when the thickness of a plated metal of the metal-plated carbon fiber is equal to or more than 0.3 μm and less than 1 μm, the amount of a plated metal may be 500-4000 mg per 1 g of carbon fiber, and thus a plated layer is evenly formed on the surface of the carbon fiber. Therefore, it is possible to prevent cracks and formability deterioration. Accordingly, it may be preferable that the thickness of the plated metal plated on the carbon fiber is equal to or more than 0.3 μm and less than 1 μm.

The seat temperature sensor 120 may be configured to detect temperature of the heating wire 110, and may be installed in each of a back plate 10a and a bottom plate 10b of the car seat 10.

The variable temperature controller 130 may be configured to control temperature of the heating wire 110 according to a diameter of the metal-plated carbon fiber and a thickness of the plated metal. In addition, the variable temperature controller 130 may include variable temperature control parts 130a, 130b, and 130c configured to adjust the temperature control sensitivity according to a diameter of the metal-plated carbon fiber and a thickness of the plated metal. The variable temperature controller 130 and variable temperature control parts 130a, 130b and 130c can be computing components including a circuit, a microcontroller or one or more microprocessors.

The variable temperature controller 130 may vary the temperature thereof by calculating a current flowing through the metal-plated carbon fiber of the heating wire 110, converting same into a resistance value, and changing, from a set table value, the resistance value to temperature. When the temperature value measured by the seat temperature sensor 120 is less than a reference temperature (60 degrees) compared to the table value, the variable temperature control parts 130a, 130b, and 130c may operate, and when being equal to or greater than the reference temperature (60 degrees), the variable temperature control parts 130a, 130b, and 130c may be shut off. In this way, the variable temperature controllers 130 may be configured to variably control temperature within a set temperature range.

The seat heater including the metal-plated carbon fiber may have the advantage of significantly shortening a temperature rise time compared to a conventional seat heater. However, since temperature rises to the reference temperature (60 degrees) in a short period of time, there may be a problem in that energy efficiency is degraded. The seat heater 100 may have the variable temperature controller 130 installed therein, and when being equal to or more than the reference temperature (60 degrees), the variable temperature controller may be configured to block current flowing through the heating wire 110, thereby preventing a sudden temperature change and maintaining the reference temperature to improve energy efficiency.

Hereinafter, referring to FIG. 2 to FIG. 5, a change in the temperature control sensitivity of the variable temperature controller 130 and a resulting change in the temperature rise time of the seat heater according to a diameter of the metal-plated carbon fiber and a thickness of the plated metal will be detailedly described.

FIG. 2 is a diagram showing a result of comparing temperature rise times of a car seat heater having improved energy efficiency according to a first embodiment of the present disclosure.

Referring to FIG. 2, FIG. 2 is a diagram showing a measured result of a temperature rise time required for heating, to 60 degrees, the seat heater (not shown) including the heating wire (not shown) including the metal-plated carbon fiber according to a first embodiment of the present disclosure and a conventional car seat heater including a metal heating wire.

In the case of a first embodiment of the present disclosure, when the diameter of the metal-plated carbon fiber of the heating wire (not shown) is equal to or more than 1 μm and less than 10 μm, and the thickness of the plated metal of the metal-plated carbon fiber of the heating wire (not shown) is equal to or more than 0.3 μm and less than 1 μm, the temperature rise time, in which the heating wire (not shown) is heated to 60 degrees, is measured in 210 seconds or more, and less than 290 seconds. On the other hand, in the case of a seat heater including a conventional metal heating wire, the temperature rise time to 60 degrees is measured in 540 seconds or more, and less than 630 seconds, and thus takes 1.8 times-3 times longer than the seat heater (not shown) of the present disclosure.

FIG. 3 is a diagram showing a result of comparing temperature rise times of a car seat heater having improved energy efficiency according to a second embodiment of the present disclosure.

Referring to FIG. 3, FIG. 3 is a diagram showing a measured result of a temperature rise time required for heating, to 60 degrees, the seat heater (not shown) including the heating wire (not shown) including the metal-plated carbon fiber according to a second embodiment of the present disclosure and a conventional car seat heater including a metal heating wire.

In the case of the second embodiment of the present disclosure, when the diameter of the metal-plated carbon fiber of the heating wire (not shown) is equal to or more than 1 μm and less than 3 μm, and the thickness of the plated metal of the metal-plated carbon fiber of the heating wire (not shown) is equal to or more than 0.3 μm and less than 0.6 μm, the temperature rise time, in which the heating wire (not shown) is heated to 60 degrees, is measured in 210 seconds or more, and less than 245 seconds.

Here, in the case of the second embodiment of the present disclosure, when the diameter of the metal-plated carbon fiber of the heating wire (not shown) is equal to or more than 1 μm and less than 3 μm, and the thickness of the plated metal of the metal-plated carbon fiber of the heating wire (not shown) is equal to or more than 0.3 μm and less than 0.6 μm, the variable temperature controller (not shown) may be configured to adjust the temperature control sensitivity such that the temperature rise time, in which the heating wire (not shown) is heated to 60 degrees, becomes 210 seconds or more, and less than 245 seconds. On the other hand, in the case of a seat heater including a conventional metal heating wire, the temperature rise time to 60 degrees is measured in 450 seconds or more, and less than 630 seconds, and thus takes 1.8 times-3 times longer than the seat heater (not shown) of the present disclosure.

FIG. 4 is a diagram showing a result of comparing temperature rise times of a car seat heater having improved energy efficiency according to a third embodiment of the present disclosure.

Referring to FIG. 4, FIG. 4 is a diagram showing a measured result of the temperature rise time required for heating, to 60 degrees, the seat heater (not shown) including the heating wire (not shown) including the metal-plated carbon fiber according to a third embodiment of the present disclosure and a conventional car seat heater including a metal heating wire.

In the case of the third embodiment of the present disclosure, when the diameter of the metal-plated carbon fiber of the heating wire (not shown) is equal to or more than 3 μm and less than 6 μm, and the thickness of the plated metal of the metal-plated carbon fiber of the heating wire (not shown) is equal to or more than 0.6 μm and less than 0.8 μm, the temperature rise time, in which the heating wire (not shown) is heated to 60 degrees, is measured in 235 seconds or more, and less than 260 seconds.

Here, in the case of the third embodiment of the present disclosure, when the diameter of the metal-plated carbon fiber of the heating wire (not shown) is equal to or more than 3 μm and less than 6 μm, and the thickness of the plated metal of the metal-plated carbon fiber of the heating wire (not shown) is equal to or more than 0.6 μm and less than 0.8 μm, the variable temperature controller (not shown) may be configured to adjust the temperature control sensitivity such that the temperature rise time, in which the heating wire (not shown) is heated to 60 degrees, becomes 235 seconds or more, and less than 260 seconds. On the other hand, in the case of a seat heater including a conventional metal heating wire, the temperature rise time to 60 degrees is measured in 485 seconds or more, and less than 705 seconds, and thus takes 1.8 times-3 times longer than the seat heater (not shown) of the present disclosure.

FIG. 5 is a diagram showing a result of comparing temperature rise times of a car seat heater having improved energy efficiency according to a fourth embodiment of the present disclosure.

Referring to FIG. 5, FIG. 5 is a diagram showing a measured result of the temperature rise time required for heating, to 60 degrees, the seat heater (not shown) including the heating wire (not shown) including the metal-plated carbon fiber according to a fourth embodiment of the present disclosure and a conventional car seat heater including a metal heating wire.

In the case of the fourth embodiment of the present disclosure, when the diameter of the metal-plated carbon fiber of the heating wire (not shown) is equal to or more than 6 μm and less than 10 μm, and the thickness of the plated metal of the metal-plated carbon fiber of the heating wire (not shown) is equal to or more than 0.8 μm and less than 1 μm, the temperature rise time, in which the heating wire (not shown) is heated to 60 degrees, is measured in 250 seconds or more, and less than 290 seconds.

Here, in the case of the fourth embodiment of the present disclosure, when the diameter of the metal-plated carbon fiber of the heating wire (not shown) is equal to or more than 6 μm and less than 10 μm, and the thickness of the plated metal of the metal-plated carbon fiber of the heating wire (not shown) is equal to or more than 0.8 μm and less than 1 μm, the variable temperature controller (not shown) may be configured to adjust the temperature control sensitivity such that the temperature rise time, in which the heating wire (not shown) is heated to 60 degrees, becomes 250 seconds or more, and less than 290 seconds. On the other hand, in the case of a seat heater including a conventional metal heating wire, the temperature rise time to 60 degrees is measured in 540 seconds or more, and less than 750 seconds, and thus takes 1.8 times-3 times longer than the seat heater (not shown) of the present disclosure.

Referring to FIGS. 2 to 5, it may be known that the time, in which the seat heater of the present disclosure is heated to 60 degrees, is shorter than the time, in which a seat heater including a conventional metal heating wire is heated to 60 degrees. Therefore, the seat heater including the heating wire including the metal-plated carbon fiber according to the present disclosure may be heated to 60 degrees in a shorter time than that of a conventional seat heater. In addition, the seat heater including the heating wire including the metal-plated carbon fiber according to the present disclosure may have the variable temperature controller installed therein to adjust the time required for raising temperature to 60 degrees, thereby improving energy efficiency.

Referring to FIG. 1 again, in the seat heater 100, according to positions of the car seat in which the heating wire 110 is installed, the diameter of the metal-plated carbon fiber of the heating wire and the thickness of the plated metal of the metal-plated carbon fiber may be formed differently. In addition, the variable temperature control parts 130a, 130b, and 130c capable of controlling temperature of the heating wire may be installed at positions, in the car seat of which the heating wire is installed, respectively.

For example, as illustrated in FIG. 1, the variable temperature control parts 130a and 130b configured to control temperature of the heating wire 110 installed in the back plate 10a may be installed therein to respectively control the temperature rise time of the heating wire 110 of the upper and the lower part of the back plate 10a. In addition, the variable temperature control part 130c may be installed in the heating wire 110 installed in the bottom plate 10b to control the temperature rise time of the heating wire 110 installed in the bottom plate 10b, separately from the temperature control of the back plate 10a.

Therefore, it is possible to variably adjust the temperature rise times of the heating wire for each of positions of the car seat. In addition, according to an embodiment of the present disclosure, temperatures of the heating wire installed in the back plate of a car seat or the bottom plate of the car seat may be separately adjusted through the variable temperature control parts 130a, 130b, and 130c so that energy efficiency can be improved.

Although described above with reference to embodiments of the present disclosure, a person skilled in the art, to which the present disclosure belongs, will understand that the present disclosure could be implemented in other specific types without changing the technical idea or essential features thereof. Therefore, it should be understood that the embodiments described above are merely exemplary in all aspects and not limited thereto.

BRIEF DESCRIPTION OF REFERENCE NUMERALS

100: Car seat heater having improved energy efficiency
10: Car seat
10a: Back plate
10b: Bottom plate
110: Heating wire
120: Seat temperature sensor
130: Variable temperature controller
130a: Variable temperature control part
130b: Variable temperature control part[PMS1]
130c: Variable temperature control part

What is claimed is:

1. A car seat heater, comprising:
a heating wire which is coupled to a car seat and which comprises a metal-plated carbon fiber;
a seat temperature sensor configured to detect a temperature of the heating wire; and
a variable temperature controller configured to control the temperature of the heating wire according to a diameter of the metal-plated carbon fiber and a thickness of a plated metal thereof, wherein:
the diameter of the metal-plated carbon fiber of the heating wire is equal to or more than 1 μm and less than 10 μm,
the thickness of the plated metal of the metal-plated carbon fiber of the heating wire is equal to or greater than 0.3 μm and less than 1 μm, and
when the diameter of the metal-plated carbon fiber of the heating wire is equal to or greater than 1 μm and less than 3 μm, and the thickness of the plated metal of the metal-plated carbon fiber of the heating wire is equal to or greater than 0.3 μm and less than 0.6 μm, a temperature control sensitivity of the variable temperature controller is adjusted such that the heating wire is heated to 60 degrees for a temperature rise time to be equal to or greater than 210 seconds and less than 245 seconds.

2. The car seat heater of claim 1, wherein
when the diameter of the metal-plated carbon fiber of the heating wire is equal to or greater than 3 μm and less than 6 μm, and
the thickness of the plated metal of the metal-plated carbon fiber of the heating wire is equal to or greater than 0.6 μm and less than 0.8 μm,
a temperature control sensitivity of the variable temperature controller is adjusted such that the heating wire is heated to 60 degrees for a temperature rise time to be equal to or greater than 235 seconds and less than 260 seconds.

3. The car seat heater of claim 1, wherein
when the diameter of the metal-plated carbon fiber of the heating wire is equal to or greater than 6 μm and less than 10 μm, and
the thickness of the plated metal of the metal-plated carbon fiber of the heating wire is equal to or greater than 0.8 μm and less than 1 μm,
a temperature control sensitivity of the variable temperature controller is adjusted such that the heating wire is heated to 60 degrees for a temperature rise time to be equal to or greater than 250 seconds and less than 290 seconds.

4. The car seat heater of claim 1, wherein
the variable temperature controller comprises a variable temperature control part configured to adjust the temperature control sensitivity according to the diameter of the metal-plated carbon fiber and the thickness of the plated metal.

* * * * *